(No Model.) 2 Sheets—Sheet 1.
G. S. GUNDERSEN.
CORN HUSKING AND FODDER CUTTING MACHINE.
No. 554,061. Patented Feb. 4, 1896.
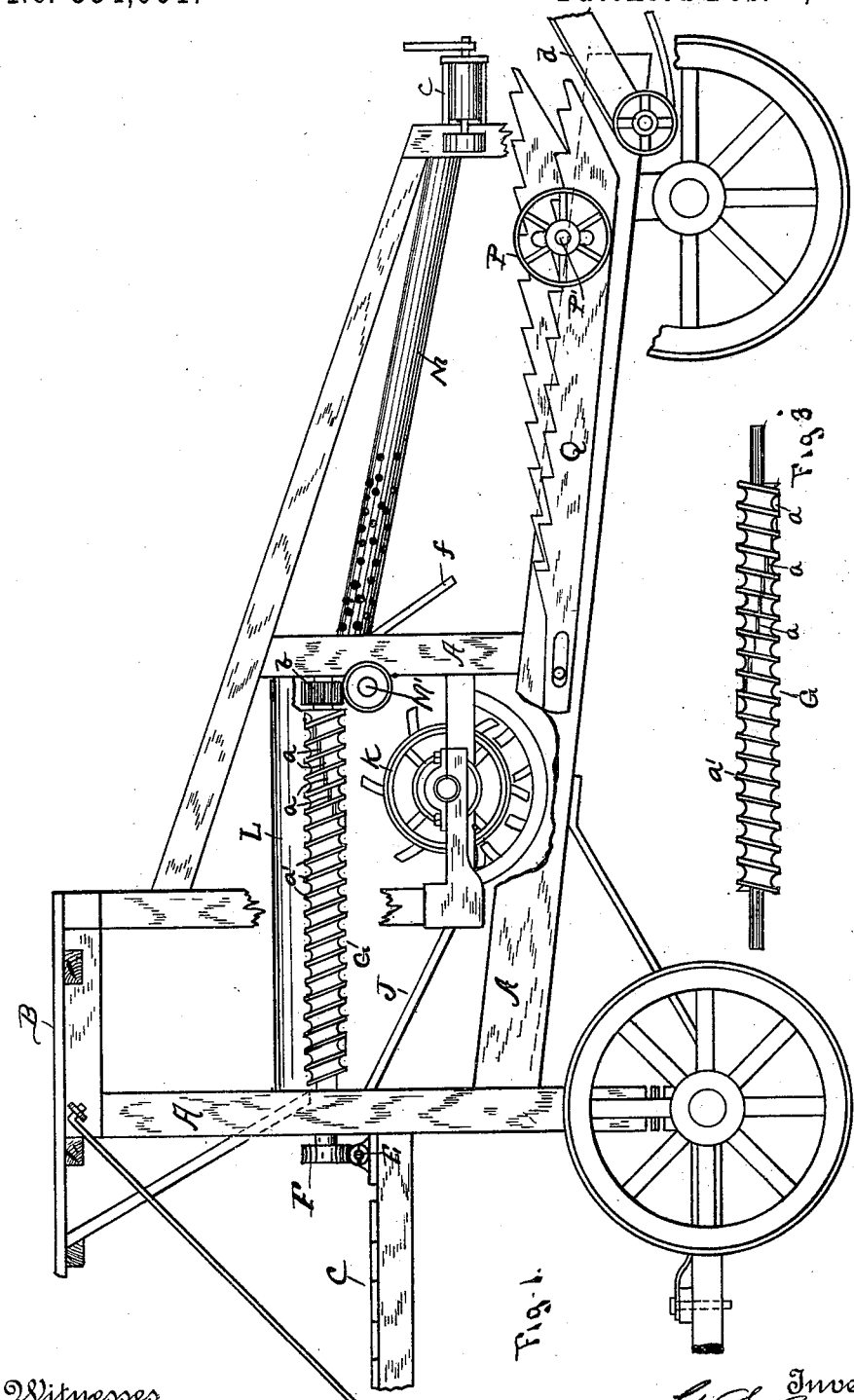
Witnesses
W. H. Hamilton.
E. J. Longenecker.
Inventor
G. S. Gundersen
By his Attorney
R. J. McCarty.

(No Model.) 2 Sheets—Sheet 2.
G. S. GUNDERSEN.
CORN HUSKING AND FODDER CUTTING MACHINE.
No. 554,061. Patented Feb. 4, 1896.
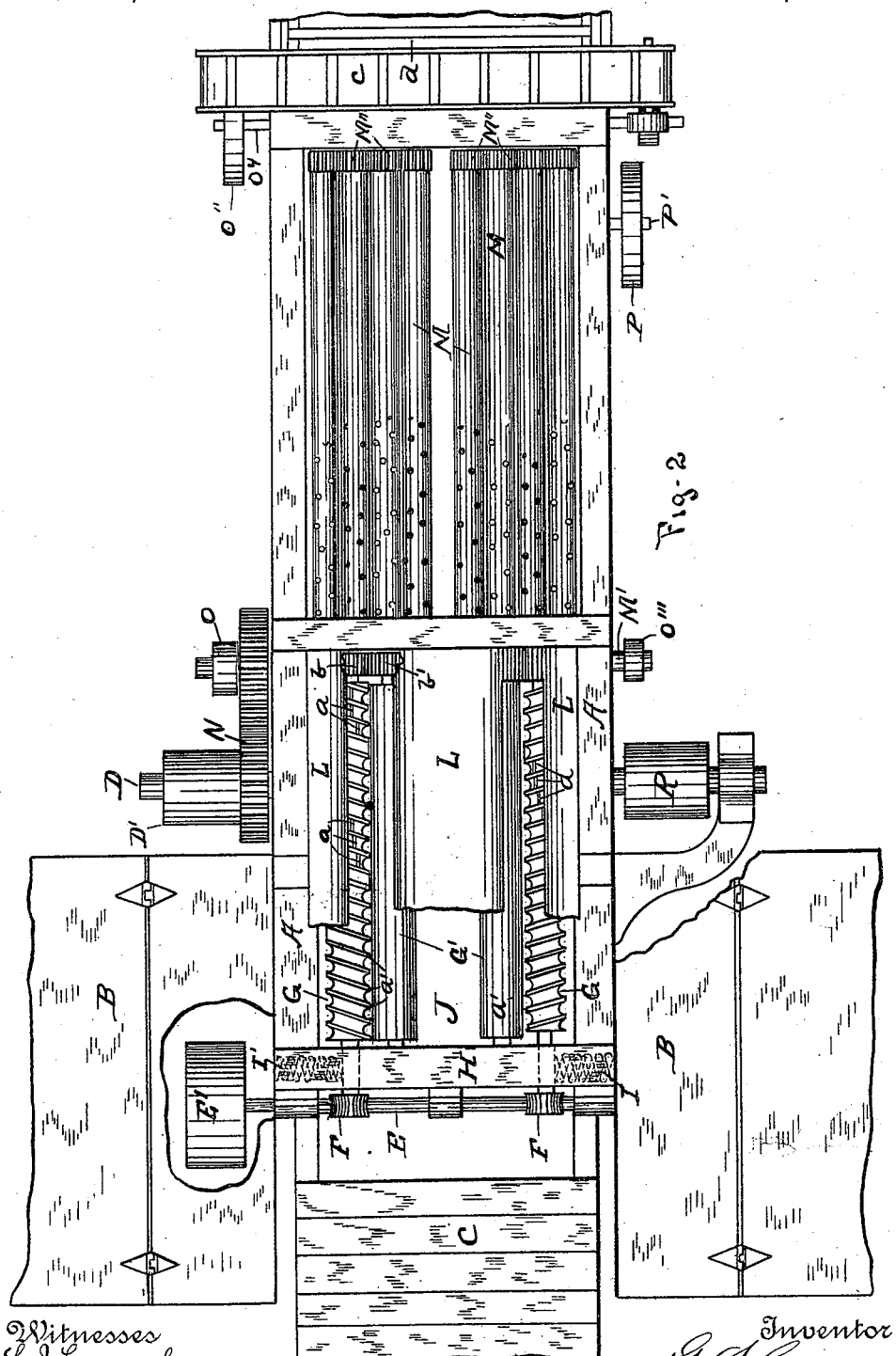
Witnesses
E. J. Longenecker.
W. W. K. Hamilton.
Inventor
G. S. Gundersen,
By his Attorney
R. J. McCarty.

UNITED STATES PATENT OFFICE.

GILBERT S. GUNDERSEN, OF DAYTON, OHIO.

CORN-HUSKING AND FODDER-CUTTING MACHINE.

SPECIFICATION forming part of Letters Patent No. 554,061, dated February 4, 1896.

Application filed September 12, 1895. Serial No. 562,350. (No model.)

*To all whom it may concern:*

Be it known that I, GILBERT S. GUNDERSEN, of Dayton, county of Montgomery, State of Ohio, have invented a new and useful Improvement in Corn-Husking and Fodder-Cutting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in corn-husking and fodder-cutting machines; and it consists of the novel features hereinafter more particularly described, reference being had to the accompanying drawings, which form a part of this application.

Of said drawings, Figure 1 is a side elevation of a machine having my improvements thereon. The relative positions of the snapping, cutting, and husking mechanisms are shown in this view. Fig. 2 is a top view of the machine. Fig. 3 is a detached view of the form of snapping-rollers shown in Figs. 1 and 2.

In a specific description of the machine, A designates the frame; B, the feed-table mounted above the various mechanism, and C is the platform below said feed-table, and upon which the feeder or operator stands.

D is a driving-shaft carrying a pulley D', which drives a worm-shaft E by a belt (not shown) which surrounds a pulley E' keyed to said worm-shaft. This latter shaft is mounted in bearings on the frame, as shown, and gears with pinions F F on the journals of snapping-rollers G, which journals are mounted in slotted bearings in the transverse bar H of the frame.

I and I' designate helical springs which are seated in openings in the bar H and press against the journals of said rollers G, as shown in Fig. 2. These rollers G are provided with a spiral thread or screw, substantially as shown.

The object of the springs I and I' is to permit a separation of the screw-rollers G from the parallel smooth rollers G' and thereby enable said rollers and screws to receive between them as many stalks of corn as may be presented. In this operation the screw-rollers open and form a V-shaped space between them and the smooth rollers, the space being the greatest at the ends where the springs are located. Referring further to said screw-rollers, as shown in the drawings, they are provided with a spiral thread $a'$ running about their length, which is intersected by a series of corrugations or short horizontal ribs $a$ extending about half-way of the length of said screws, and the upper edges of which terminate flush with the outer edge of the thread, so that the corn will not be shelled from the ears by said ribs during the operation of the machine. The position of each of these ribs $a$ alternates with the two adjacent ribs, forming graduated lines, as shown in Fig. 1. As shown, the said ribs are arranged in this alternating or spiral form, in order that each may come in contact with but one stalk of corn at a time, thereby avoiding too much pressure on the rollers. The grooves are deep enough only to receive one stalk at a time without pressure. The said ribs effect a lodgment of the stalks of corn as said stalks pass through the rollers, severing the ears therefrom and permitting the stalks to pass downward to the incline J, from whence they pass to the cutting-cylinder K. The latter is not a part of the present invention. Therefore it does not call for a detailed description.

The arrangement of the intersecting ribs $a$, as hereinbefore described, is an important feature of this invention, as thereby the ears of corn are continuously severed by the revolving corrugated rollers G, and the operation is not intermittent.

There is but one point of contact, approximately an inch and a half long, throughout the length of the snapping-rollers. Consequently there is only the pressure of one stalk exerted on the rollers at each operation, while the capacity of said rollers is not curtailed. Heretofore, so far as I am aware, it has been the practice to arrange the snapping or severing ribs longitudinally on the roller. This has serious objections, chiefly among which may be mentioned the inability of said ribs to act simultaneously on stalks of varying sizes. For example, should there be among the stalks fed to the rollers one of a larger size than the rest the snapping-ribs would be prevented from coming in contact with the smaller stalks. Therefore they would remain at the rollers until they were acted upon by the next approaching line of ribs, and their being acted upon even by these ribs would depend upon the sizes of the stalks subsequently fed. This is an objection that the present invention entirely overcomes.

The smooth rollers G' G' are driven by the screw-rollers through intermeshing spur-gears b and b' mounted on the lower ends of said rollers.

L designates curved shields that are secured to the side bars of the frame and inclose the gears b and b'. These shields direct the stalks of corn to the rollers, and also direct the severed ears to the husking-rollers M. The latter rollers, as well as the devices adjacent thereto for disposing of the ears of corn and the husks, are of well-known construction. The said husking-rollers are driven by worm-gearing from a shaft M' and spur-wheels M'' on the lower ends thereof.

N is a driving spur-gear that meshes with a similar size gear on the shaft M'. O and and O''' are pulleys on said shaft which are belted to pulleys O'' and P. The former pulley O'' is mounted on a shaft O⁴, from which are driven the corn and fodder carriers c and d in a well-known manner.

P designates a pulley belted to pulley O''' and mounted on a crank-shaft P' that operates the shakers or carriers Q.

R designates the main driving-pulley.

f designates a guard depended from the frame to prevent the fodder from being thrown into the husking-rollers and to guide it onto the shakers or carriers Q.

By the construction set forth in the drawings and described in the foregoing it is apparent that the necessity of feeding the stalks directly between the snapping-rollers by hand is avoided. All that is necessary is to dump the stalks onto the snapping-rollers without any effort upon the part of the feeder to direct them between the rollers, and, further, the capacity of the machine may be increased by adding more snapping-rollers and increasing the width of the machine. This addition of more rollers is possible, owing to the mounting of said rollers being parallel with or lengthwise of the frame.

The smooth snapping-rollers G' may be provided with pins similar to those on the husking-rollers to assist in feeding the stalks to the grooves in the corrugated rollers. As shown in Fig. 1, the feed-table is mounted above the snapping-rollers. This is an important feature of the construction, as the broken stalks, sub-stalks, leaves, and general débris are dropped onto said snapping-rollers first, and are therefore caused to pass through said snapping-rollers, and cannot come in contact with the husking-rollers.

Having fully described my invention, I claim—

1. The combination with the roller G', of a companion roller G provided with a spiral thread a' and adjacent spiral groove extending throughout the length of said roller, a series of ribs a intersecting said spiral thread and terminating flush with the outer surface of said thread, the said ribs a extending around the roller substantially as shown and described, so that the maximum pressure will be upon but one of said ribs at a time.

2. In a corn-husking machine, the combination with the frame, the husking-rollers mounted lengthwise thereon, and a shredding-cylinder mounted in a transverse position in said frame, of snapping-rollers G and G', the former being of a continuous spiral form of uniform diameter and the thread thereof being intersected by a series of transverse ribs a extending spirally around said roller, the said rollers G and G' mounted parallel with the husking-rollers and above the shredding-cylinder, and the inner ends of the husking-rollers and the snapping-rollers being adjacent to each other so that the severed ears of corn will pass from the snapping-rollers to the husking-rollers substantially as described.

3. In a corn-husking machine, the combination with one or more snapping-rollers G', of one or more companion rollers G each of which is provided with a peripheral thread running spirally throughout its length, a series of horizontal ribs intersecting said thread at different points and extending spirally around said roller, substantially as and for the purposes specified.

4. In a corn-husking machine, the combination with the supporting-frame, husking-rollers mounted lengthwise thereon, and a shredding-cylinder mounted at a right angle to said husking-rollers, of snapping-rollers G and G', the former having a continuous spiral thread from end to end which is intersected by a series of ribs extending spirally around said roller in an uninterrupted line, both of said rollers G and G' being mounted parallel with the husking-rollers and above the shredding-cylinder, and a feed-table mounted above said snapping-rollers, substantially as described.

In testimony whereof I have hereunto set my hand this 4th day of September, 1895.

GILBERT S. GUNDERSEN.

Witnesses:
R. J. McCARTY,
C. W. DUSTIN.